United States Patent [19]

Lasky et al.

[11] 4,121,010
[45] Oct. 17, 1978

[54] THERMOLUMINESCENT PHOSPHOR

[75] Inventors: Jerome B. Lasky; Paul R. Moran, both of Madison, Wis.

[73] Assignee: The United States of America as represented by the United States Department of Energy, Washington, D.C.

[21] Appl. No.: 819,429

[22] Filed: Jul. 27, 1977

[51] Int. Cl.² .......................... B32B 5/16; C09K 11/08
[52] U.S. Cl. .................................... 428/403; 250/483; 252/301.4 H; 252/408; 427/215; 427/64; 427/70
[58] Field of Search ............... 428/403; 252/301.4 H, 252/408 R; 250/483; 427/215, 64, 70

[56] References Cited

U.S. PATENT DOCUMENTS

| 3,320,180 | 5/1967 | Swinehart | 252/301.4 H |
| 3,532,777 | 10/1970 | Stewart et al. | 252/301.4 H |
| 3,567,922 | 3/1971 | Blair | 252/301.4 H |
| 3,808,148 | 4/1974 | Portal | 252/301.4 H |
| 3,936,390 | 2/1976 | Drurkina | 252/301.4 H |
| 3,996,472 | 12/1976 | Rabatin | 252/301.4 H |

Primary Examiner—Michael F. Esposito
Attorney, Agent, or Firm—Dean E. Carlson; Frank H. Jackson; Hugh W. Glenn

[57] ABSTRACT

A thermoluminescent phosphor comprising LiF doped with boron and magnesium is produced by diffusion of boron into a conventional LiF phosphor doped with magnesium. Where the boron dopant is made to penetrate only the outer layer of the phosphor, it can be used to detect shallowly penetrating radiation such as tritium beta rays in the presence of a background of more penetrating radiation.

7 Claims, 3 Drawing Figures

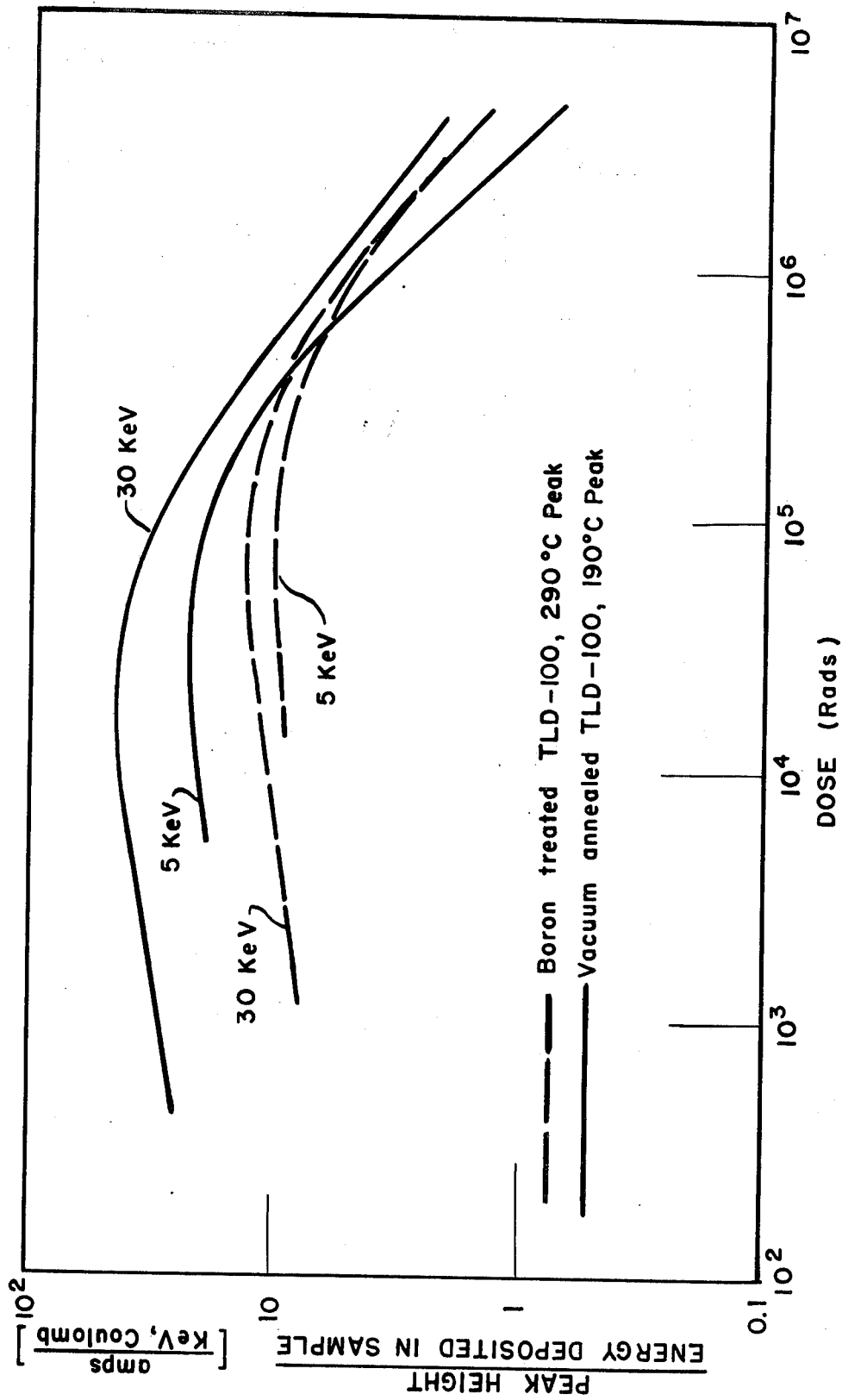

THERMOLUMINESCENT PHOSPHOR

CONTRACTUAL ORIGIN OF THE INVENTION

The invention described herein was made in the course of, or under, a contract with the U.S. ENERGY RESEARCH AND DEVELOPMENT ADMINISTRATION.

BACKGROUND OF THE INVENTION

The present invention relates to thermoluminescent phosphors used in the detection of radiation. In particular, it pertains to LiF phosphors doped with magnesium intended for use in mixed radiation fields including, e.g. low energy beta radiation emitted by tritium in the presence of more penetrating X and gamma radiation. With the addition of a hydrogenous overlay such phosphors also can be used to detect fast neutrons that produce shallowly penetrating recoil protons as they pass through the hydrogenous layer.

Phosphors of LiF have been widely used in the measurement of radiation in clinical applications and personnel dosimetry. Such phosphors are commercially available, for instance the TLD-100 manufactured by the Harshaw Chemical Company, Solon, Ohio. This phosphor contains lithium in its natural isotopic ratio (92.5% Li-7 and 7.5% Li-6 by weight), approximately 100-200 parts per million magnesium and about 15 parts per million titanium by weight.

Phosphors of this type, on exposure to radiation will store energy that subsequently can be released at a convenient time as thermoluminescence by heating to appropriate temperatures. The thermoluminescence can be recorded to provide a glow curve with peaks at characteristic temperatures. FIG. 1 illustrates such a glow curve for a TLD 100 phosphor after exposure to CS-137 gamma rays and to electrons. The glow curves include a number of thermoluminescent peaks between room temperature and about 200° C. Peaks at higher temperatures are seldom observed with this phosphor.

The present inventors have observed and reported a thermoluminescent peak at about 290° C. from a TLD-100 phosphor ("TL Response to 1-30 KeV Electrons of TLD-100 and TLD-100 Diffused with Various Elements," Technical Report, C00-1105-226, University of Wisconsin, 1975). This publication suggests that a LiF phosphor doped with an unknown impurity in an outer layer can be employed to discriminate between radiation which deposits its energy in the outer layer and other radiation which deposits its energy within the bulk of the phosphor. However, at the time of this publication, the critical dopant responsible for this new peak was unknown.

One of the previous methods used for personnel monitoring of tritium in a mixed radiation field involves stacking of two TLD-100 thermoluminescent chips. The beta radiation from tritium penetrates only the top of the first chip. However, X-rays and gamma rays will penetrate both chips, thus allowing some discrimination between the two types of radiation. Unfortunately, tritium beta rays penetrate only a few micrometers while the thinnest LiF chips practical for routine use are about 1 mm in thickness. This means that the thermoluminescence resulting from tritium exposure in the top chip is diluted by more than a factor of 100, when compared to the reading resulting from X-ray or gamma ray exposure of the second chip.

Therefore, in view of the disadvantages of the prior art, it is an object of the present invention to provide a new thermoluminescent phosphor including LiF in major portion that can be used to detect shallowly penetrating radiation in the presence of a background of more penetrating radiation.

It is a further object to provide a LiF, thermoluminescent phosphor having suitable dopants for providing a thermoluminescent peak at about 290° C.

It is also an object of the present invention to provide a LiF thermoluminescent phosphor with a dopant only within the outer layer thereof which will permit discrimination between radiation that deposits its energy in the outer layer from radiation that deposits its energy within the bulk of the phosphor.

It is another object of the present invention to provide a method of preparing a LiF thermoluminescent phosphor containing a particular dopant in portions thereof which will produce recognizable thermoluminescent peaks only from that doped portion.

SUMMARY OF THE INVENTION

In accordance with the present invention, a thermoluminescent phosphor is provided of LiF with the dopants boron and magnesium. One specific aspect of this invention is a LiF thermoluminescent phosphor doped throughout its mass with magnesium and having an outer layer that includes both boron and magnesium dopants.

The invention also comprehends a method of preparing such a boron doped, thermoluminescent phosphor in which LiF doped with Mg is exposed to a boron containing vapor for a sufficient period of time at a temperature in excess of 400° C. to diffuse an effective amount of boron into the outer layer of the phosphor and thereby impart the capability of producing a thermoluminescent peak at about 290° C. in response to radiation absorbed in the outer layer.

BRIEF DESCRIPTION OF THE DRAWINGS

FIG. 3 is a graph of thermoluminescent sensitivity in peak height per radiation energy deposited in the sample versus dose in Rads for TLD-100 phospors irradiated with 5 KeV and 30 KeV electrons. Two of the curves represent ordinary phosphors and the two remaining curves represent phosphors doped with boron in accordance with the present invention.

DETAILED DESCRIPTION OF THE PREFERRED EMBODIMENT

Figure 1:
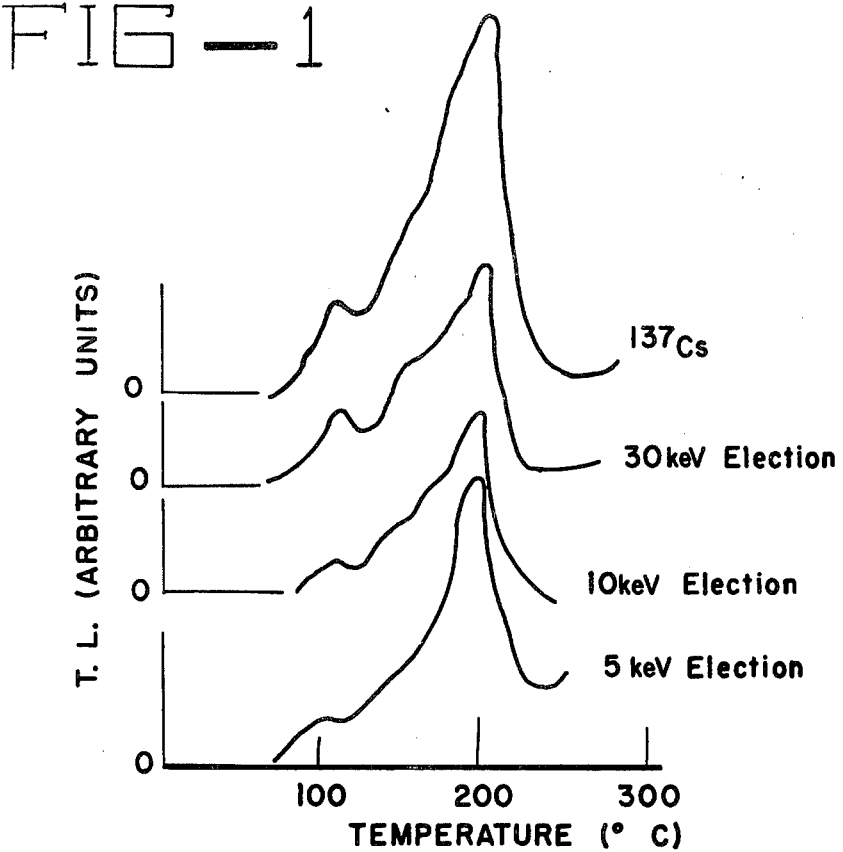
FIG. 1 shows typical glow curves of arbitrary thermoluminescent units versus temperature of TLD-100 crystals annealed in vacuum at 400° C. followed by exposure to gamma and various levels of low energy electrons. These curves illustrate the response of a prior art phosphor composition.

Thermoluminescent phosphors doped with magnesium at levels of 100-200 parts per million are well known and are commercially available. Such phosphors including those with magnesium dopants up to its solubility limit of about 300 parts per million in LiF can be employed in preparing the phosphor of the present invention. In a commercially available phosphor such as TLD-100, titanium at levels of about 10-20 parts per million is also included. The titanium dopant appears to enhance the recombination process and therefore to aid in the thermoluminescent reading of the phosphors but it is not an essential constituent in the phosphor of this invention.

A thermoluminescent phosphor in accordance with the present invention is conveniently prepared by providing a commercially available phosphor of lithium fluoride that includes magnesium as a dopant at a concentration level of up to the solubility limit of about 300 parts per million. One such phosphor is available from Harshaw Chemical as TLD-100 and includes about 100 to 200 parts per million magnesium.

An additional dopant, of boron, can be diffused into the LiF:Mg phosphor by one of several methods. The portion of the phosphor that is to absorb low energy radiation and respond with a thermoluminescence peak at about 290° C. should include about 2 to about 30 ppm boron. These are estimated boron concentrations based on mass spectroscopy analyses of boron doped TLD-100. These values should be accurate to within a factor of 2 or 3. At boron levels read as 2 ppM the 290° C. peak is just detectable while at reading of 30 ppM and above no further increase in the 290° C. peak is observed. It is therefore estimated, subject to the above accuracies that at least 2 ppM boron is required to produce a peak at 290° C. and that concentrations of 30 ppM boron and above produce a fully saturated 290° C. peak in LiF:Mg phosphors.

One proven method for doping boron into LiF involves heating the phosphor to a sufficient temperature in the presence of a vapor containing boron. Since lithium fluoride melts at 870° C., temperatures approaching this level, e.g. 800° C. and above are to be avoided but, temperatures of 400° C. or more are preferred to provide practical diffusion rates. Most of the boron-doped phosphors that have been produced by this method were prepared by diffusing boron vapor into the lithium fluoride phosphors at temperatures of about 600° C. to 700° C.

The boron-containing vapor can be provided from various boron sources. Solid pieces of boron metal, boron nitride, or boric oxide ($B_2O_3$) have each produced sufficient vapor containing boron to diffuse an effective quantity of boron dopant into lithium fluoride ribbons or crystals when heated to about 600° C.–700° C. in a suitable laboratory furnace and in the presence of trace amounts of water vapor. Boric acid held at 100° C.–200° C. upstream from the phosphor has also been found to be a suitable source of boron that does not require the addition of water vapor. It is estimated, from the vapor pressure of boric acid that 100 ppM boron in the form of boric acid vapor in an inert gas flow above the phosphor is sufficient to cause a fully saturated peak. The inert gas is defined as one which will not react with the phosphor or boron source, e.g. nitrogen or argon.

The lithium fluoride phosphor is exposed to the boron-containing vapor at the elevated temperature for an effective period of time to provide the desired depth of boron diffusion. The boron (as the boron hydroxyl complex of boric acid or other form) can be made to diffuse throughout the phosphor to provide a 290° C. peak for detecting most types of radiation or to diffuse only into surface layers to provide different glow curves for shallowly penetrating radiation. Some approximate diffusion depths are tabulated in Table I. The depths of penetration given in Table I were determined by subsequently exposing the phosphor to electron radiation of known energy and penetration capability. The maximum electron energy which produced an increase in the thermoluminescent response characterizing the phosphor of the present invention was presumed to determine the penetration depth.

TABLE I

| Phosphor T C | Time Hours | Electron Energy KeV | Diffusion Depth $\mu m$ |
| --- | --- | --- | --- |
| 600 | 1 | 16.5 | 2 |
| 650 | 0.3 | 27 | 5 |
| 700 | 1 | 30 | >6 |
| 700 | 0.08 | 5 | 1 |
| 700 | 15 | CS-137 gamma | ≈60 |

Other methods may also be employed in doping a lithium fluoride phosphor with boron. Ion implantation methods are expected to be suitable to provide boron within the outer layers of a crystal chip. The lithium fluoride chip or ribbon can be maintained at a negative potential with respect to a source of positively charged boron ions. The positive boron ions will be accelerated into and embedded within the outer layers of the negatively biased lithium fluoride.

Thermoluminescent phosphors prepared as described have particular value in determining tritium beta radiation in the presence of more penetrating background radiation such as gamma or X-radiation. The low-energy tritium betas deposit their energy within a small depth, i.e. 0.5–3 micrometers ($\mu m$) of a lithium fluoride phosphor. Therefore, phosphors having only a thin outer layer doped with boron impurity can be used to generate a glow curve in which the thermoluminescent peak, at 290° C., can be used to give readings corresponding to the low-energy beta radiation. X, gamma and other more penetrating radiation will deposit their energy throughout the bulk of the phosphor and therefore be fairly represented within the other thermoluminescent peaks at lower temperatures.

Figure 2:
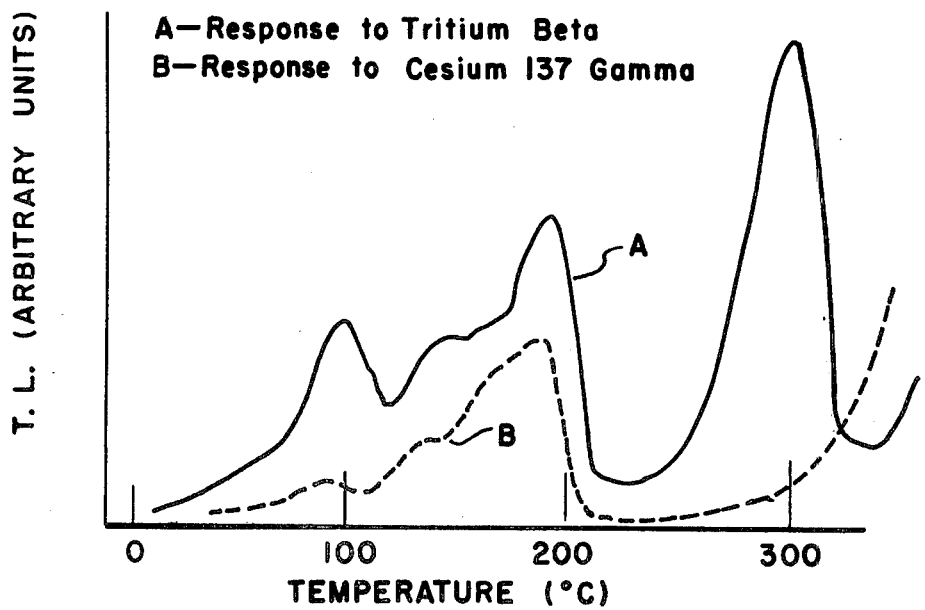
FIG. 2 is a glow curve of arbitrary thermoluminescent units versus temperature for a LiF phosphor including boron dopant in its outer surface layers in accordance with the present invention.

The FIGS. 1 and 2 illustrate how the low-energy beta radiation can be discriminated from the more penetrating gamma or X-radiation. In FIG. 1, the various glow curves that are produced after irradiating a conventional TLD-100 lithium fluoride phosphor with electrons of various energy levels and with gamma radiation from $Cs^{137}$. The phosphors were annealed in vacuum for about one hour at 400° C. prior to irradiation. It is quite clear from FIG. 1 that the peaks produced by the various types of radiation are at nearly the same temperatures. FIG. 2, however, illustrates glow curves for a lithium fluoride phosphor having about a 3-6 micron outer layer doped with boron impurity. This phosphor is irradiated with both $Cs^{137}$ gamma rays and beta rays from tritium (8 KeV mean, 18 KeV maximum). The resulting glow curves show that only the low-energy beta radiation results in a significant peak at 290° C. Similar peaks at 290° C. also have been observed following irradiation with 5, 10 and 30 KeV electrons.

FIG. 3 illustrates the thermoluminescent sensitivity of TLD-100 phosphors both with and without boron doping. The untreated phosphors were merely annealed in vacuum at about 400° C. for about an hour as is ordinarily done and the boron-doped phosphors were contacted with boric acid vapor as described herein. Since the untreated LiF:Mg phosphor has no peak at 290° C., its 190° C. peak resulting from irradiation with 5 KeV and 30 KeV electrons is used to show sensitivity. Although the data presented shows the boron treated phosphors to be somewhat less sensitive, the useful range of the new phosphor is seen to be similar to that of the well known TLD-100.

The following example illustrates preparation of a phosphor by one suitable method.

EXAMPLE

About 0.5 grams of $B(OH)_3$ powder is placed in a 33 mm diameter quartz tube which is continuously flushed with 50 cc/min dry nitrogen. The boric acid is held at about 120° C. for 5 days during which time the excess water vapor from decomposition of the boric acid is driven out of the tube. After this period a phosphor containing about 100 ppM magnesium and 15 ppM titanium and whose typical dimensions are $3 \times 3 \times 1$ mm, is placed in the quartz tube 30 cm down stream from the boric acid. This region of the quartz tube containing the phosphor is held at 700° C. After about 30 minutes of exposure to the boric acid vapor and subsequent beta and gamma irradiation, the phosphor is found to exhibit thermoluminescent glow curves similar to those shown in FIG. 2. The less penetrating beta radiation results in a thermoluminescent peak at about 290° C. to permit its discrimination from the more penetrating gamma radiation.

Other phosphors were prepared in like manner with elemental boron and boron nitride used as a source of boron vapor. In these cases, trace amounts of water vapor were present in the tube and both the sample and boron source was held at about 700° C.

Phosphors prepared in accordance with Example I can be covered with a layer of hydrogenous material such as polyethylene and exposed to fast neutron radiation of several MeV. Shallowly penetrating recoil protons resulting from the neutron radiation will deposit most of their energy in surface layers of the phosphor to produce the 290° C. thermoluminescent peak. The more deeply penetrating radiation such as gamma radiation will deposit its energy throughout the phosphor to permit discrimination between fast neutron and other more penetrating radiation.

It will therefore be clear that the present invention provides a new phosphor composition that is characterized by a thermoluminescent peak at about 290° C. This peak is attributed to the diffusion of the boron or a boron hydroxyl complex into lithium fluoride previously doped with magnesium. By providing a phosphor with only a few microns outer layer doped with boron and a core that includes lithium fluoride doped with magnesium, the radiation level of low-energy beta radiation such as from tritium can be determined even in a background of more penetrating radiation.

The embodiments of the invention in which an exclusive property or privilege is claimed are defined as follows:

1. A thermoluminescent phosphor comprising a major portion by weight of LiF and a minor proportion by weight of the dopants boron and magnesium.

2. The thermoluminescent phosphor of claim 1 wherein said phosphor includes an outer layer comprising LiF with magnesium and boron dopants, overlaying an inner core that is substantially free of the boron dopant to provide the capability of discriminating between radiation absorbed only in the outer layer from radiation that penetrates into the inner core.

3. The thermoluminescent phosphor of claim 2 wherein said boron dopant is contained within the outer layer of said phosphor to a depth of about 3 to 6 microns.

4. The phosphor of claim 2 wherein said outer layer containing said boron dopant has the capability of producing a thermoluminescent peak at about 290° C. in response to radiation absorbed therein and said inner core substantially free of boron dopant lacking said capability of producing said 290° C. peak whereby discrimination of low energy radiation is achieved.

5. The thermoluminescent phosphor of claim 1 wherein said boron dopant is contained within at least a surface portion of said phosphor at a level of about 2 to 30 parts per million by weight.

6. The phosphor of claim 1 wherein said magnesium is included at a level of up to about 300 parts per million by weight.

7. The thermoluminescent phosphor of claim 1 wherein said boron is included as dopant at a level achieved by exposing said phosphor at about 600° C.–700° C. to boron-containing vapor for at least 5 minutes at a partial pressure about in equilibrium with boric acid held at 100° to 200° C.

* * * * *